US012806613B2

(12) United States Patent
Takahashi et al.

(10) Patent No.: US 12,806,613 B2
(45) Date of Patent: Nov. 24, 2026

(54) PHOTOCATALYST DECOMPOSITION SYSTEM

(71) Applicant: Hitachi, Ltd., Tokyo (JP)

(72) Inventors: Hiromasa Takahashi, Tokyo (JP); Shin Yabuuchi, Tokyo (JP); Naoto Fukatani, Tokyo (JP); Daiko Takamatsu, Tokyo (JP)

(73) Assignee: HITACHI, LTD., Tokyo (JP)

(*) Notice: Subject to any disclaimer, the term of this patent is extended or adjusted under 35 U.S.C. 154(b) by 642 days.

(21) Appl. No.: 18/485,656

(22) Filed: Oct. 12, 2023

(65) Prior Publication Data

US 2024/0139723 A1 May 2, 2024

(30) Foreign Application Priority Data

Nov. 2, 2022 (JP) ................................ 2022-175972

(51) Int. Cl.
*B01J 7/00* (2006.01)
*B01J 21/02* (2006.01)
(Continued)

(52) U.S. Cl.
CPC ................ *B01J 35/39* (2024.01); *B01J 7/00* (2013.01); *B01J 21/02* (2013.01); *B01J 21/063* (2013.01);
(Continued)

(58) Field of Classification Search
CPC ... B01J 7/00; B01J 21/02; B01J 21/063; B01J 21/10; B01J 21/20; B01J 21/22;
(Continued)

(56) References Cited

U.S. PATENT DOCUMENTS 8,790,754 B1 * 7/2014 Rangan .................... B01J 27/24 427/419.7
9,364,808 B2 * 6/2016 Yoon ...................... B01J 19/127
(Continued)

FOREIGN PATENT DOCUMENTS

JP 2015-063425 A 4/2015
WO 2004/085306 A1 10/2004

OTHER PUBLICATIONS

European Patent Office, Extended European Search Report, Application No. 23204828.0, dated Apr. 4, 2024, in 8 pages.
(Continued)

*Primary Examiner* — Dapinder Singh
(74) *Attorney, Agent, or Firm* — PROCOPIO, CORY, HARGREAVES & SAVITCH LLP

(57) ABSTRACT

To provide a photocatalyst decomposition apparatus that can supply a liquid phase containing a substance to be decomposed by a photocatalyst and that can perform decomposition of the substance more efficiently than in the related art. A photocatalyst decomposition system according to the invention includes: a gas phase generation apparatus configured to convert a liquid phase containing a decomposition object into a gas phase; and a photocatalyst member configured to come into contact with the gas phase to decompose the decomposition object by light from a light source. The photocatalyst member includes a base material formed of a porous material and a photocatalyst layer provided on a surface of the base material.

20 Claims, 7 Drawing Sheets

300a

(51) Int. Cl.

| | |
|---|---|
| ***B01J 21/06*** | (2006.01) |
| ***B01J 23/02*** | (2006.01) |
| ***B01J 23/10*** | (2006.01) |
| ***B01J 23/20*** | (2006.01) |
| ***B01J 23/22*** | (2006.01) |
| ***B01J 23/30*** | (2006.01) |
| ***B01J 23/42*** | (2006.01) |
| ***B01J 23/46*** | (2006.01) |
| ***B01J 23/50*** | (2006.01) |
| ***B01J 23/58*** | (2006.01) |
| ***B01J 23/60*** | (2006.01) |
| ***B01J 23/64*** | (2006.01) |
| ***B01J 23/648*** | (2006.01) |
| ***B01J 23/68*** | (2006.01) |
| ***B01J 23/75*** | (2006.01) |
| ***B01J 23/755*** | (2006.01) |
| ***B01J 27/04*** | (2006.01) |
| ***B01J 27/14*** | (2006.01) |
| ***B01J 27/19*** | (2006.01) |
| ***B01J 27/198*** | (2006.01) |
| ***B01J 27/24*** | (2006.01) |
| ***B01J 35/39*** | (2024.01) |
| ***C01B 3/04*** | (2026.01) |
| ***C01B 3/042*** | (2026.01) |
| ***C01B 13/02*** | (2006.01) |

(52) U.S. Cl.

CPC ............... *B01J 23/02* (2013.01); *B01J 23/10* (2013.01); *B01J 23/20* (2013.01); *B01J 23/22* (2013.01); *B01J 23/30* (2013.01); *B01J 23/42* (2013.01); *B01J 23/462* (2013.01); *B01J 23/464* (2013.01); *B01J 23/468* (2013.01); *B01J 23/50* (2013.01); *B01J 23/58* (2013.01); *B01J 23/60* (2013.01); *B01J 23/6482* (2013.01); *B01J 23/681* (2013.01); *B01J 23/75* (2013.01); *B01J 23/755* (2013.01); *B01J 27/04* (2013.01); *B01J 27/14* (2013.01); *B01J 27/198* (2013.01); *B01J 27/24* (2013.01); *C01B 3/045* (2013.01); *C01B 13/0207* (2013.01)

(58) Field of Classification Search

CPC . B01J 21/30; B01J 21/42; B01J 21/462; B01J 21/464; B01J 21/468; B01J 21/50; B01J 21/58; B01J 21/60; B01J 21/6482; B01J 21/681; B01J 21/75; B01J 21/755; B01J 27/04; B01J 27/14; B01J 27/198; B01J 27/24; B01J 35/39; C01B 3/045; C01B 13/0207; C25B 1/042; C25B 9/50; C25B 11/052; C25B 11/087

See application file for complete search history.

(56) References Cited

U.S. PATENT DOCUMENTS

| | | | | |
|---|---|---|---|---|
| 12,270,114 | B2 * | 4/2025 | Guerra | C25B 1/55 |
| 12,304,814 | B2 * | 5/2025 | Tozawa | C01B 3/04 |
| 2005/0000792 | A1 | 1/2005 | Yamada et al. | |
| 2013/0256147 | A1 | 10/2013 | Lewis et al. | |
| 2016/0040303 | A1 * | 2/2016 | Gershon | B01J 19/127 204/263 |
| 2019/0322797 | A1 * | 10/2019 | Ullah | C08G 61/124 |
| 2020/0407859 | A1 * | 12/2020 | Kobayashi | B01J 23/72 |
| 2021/0040625 | A1 * | 2/2021 | Guerra | C25B 1/55 |

OTHER PUBLICATIONS

Han, et al., "Enhanced photocatalytic splitting of photothermally induced water vapor to evolve hydrogen", Chemical Engineering Journal, dated Apr. 21, 2022, in 8 pages.

Japanese Office Action issued in Japanese Application No. 2022-175972 dated Jun. 2, 2026, in 8 pages.

* cited by examiner

300c

300d

PHOTOCATALYST DECOMPOSITION SYSTEM

CROSS-REFERENCE TO RELATED APPLICATION

This application claims priority to Japanese Patent Application No. 2022-175972 filed on Nov. 2, 2022, the entire contents of which are incorporated by reference herein.

BACKGROUND OF THE INVENTION

1. Field of the Invention

The present invention relates to a photocatalyst decomposition system.

2. Description of Related Art

A technique for decomposing water with sunlight and generating hydrogen with high efficiency is a storable energy carrier production technique having a low cost without discharging $CO_2$ and is expected to be applied to a renewable energy service and an environmental service such as hydrogen power generation and a hydrogen automobile that contributes to fossil fuel elimination.

Further, if a photocatalyst technique for decomposing a chemical substance having a large environmental influence is developed and becomes a technique that can use sunlight with high efficiency, the technique can be applied to production of a useful material by decomposing $CO_2$ and methane discarded in not only water but also atmosphere, and $NO_x$ or a nitrate salt flowing into a water source from soil. Reduction of $CO_2$ and methane contributes to inhibition of global warming, and $NO_x$ or a nitrate salt flowing into a water source from soil contributes to biodiversity through water or atmosphere. By not only decomposing but also converting such substances to a high-value substance such as alcohol or formic acid, such a technique is expected to be expanded as an industry with recycling-oriented PF through artificial photosynthesis as a substance generation system.

An example of such a technique is disclosed in PTL 1. PTL 1 discloses a water photolysis apparatus including a casing 1 that includes a light transmission window 12 configured to transmit sunlight L, and a photolysis layer 5 provided on the casing 1. There is disclosed a configuration in which the photolysis apparatus is provided in a state of floating on a water layer 9, water vapor is evaporated from the water layer 9 due to irradiation with sunlight L, the water vapor is introduced into the photolysis layer 5, photocatalyst particles 52 are excited by the sunlight L in the photolysis layer 5, and the introduced water vapor is decomposed into hydrogen and oxygen. According to the configuration in PTL 1, it is possible to provide a water photolysis apparatus that can more efficiently obtain hydrogen and oxygen by inhibiting a reverse reaction and that can further promote photolysis of water by effectively using solar energy.

CITATION LIST

Patent Literature

PTL 1: WO 2004/085306

SUMMARY OF THE INVENTION

In the related art, in a configuration of an apparatus for decomposing a liquid phase by using a photocatalyst, light is emitted to a photocatalyst in a state in which the photocatalyst is charged in water in a form of a powder or a thin film to decompose water. A gas obtained by decomposition is generated as air bubbles on a surface of the photocatalyst, a certain amount of the gas is desorbed into water and collected, and there is a portion covered with the generated air bubbles on the surface of the photocatalyst. Accordingly, a contact area between a catalyst and water is reduced, resulting in saturation or reduction of a reaction rate, and thus an object is to eliminate such a problem and maintain a high reaction rate.

As described above, since air bubbles or the like in a liquid phase may cause a reaction rate saturation or reduction, it is important to improve efficiency of the reaction by allowing the photocatalyst to react in a state of being charged in a gas phase to inhibit generation of air bubbles and to increase a contact surface area between the gas phase and the photocatalyst. In PTL 1 described above, the photocatalyst is supported in a state of being dispersed in a powder form on a porous material, it is difficult to form electrical continuity, and it is difficult to improve efficiency of the reaction by using an electrode or the like.

In view of the above circumstances, an object of the invention is to provide a photocatalyst decomposition system that can supply a gas phase containing a substance to be decomposed by a photocatalyst and that can perform decomposition of the substance more efficiently than in the related art.

According to an aspect of the invention for solving the above problem, a photocatalyst decomposition system includes: a gas phase generation apparatus configured to convert a liquid phase containing a decomposition object into a gas phase; and a photocatalyst member configured to come into contact with the gas phase to decompose the decomposition object by light from a light source and generate a gas phase. The photocatalyst member includes a base material formed of a porous material and a photocatalyst layer provided on a surface of the base material.

A more specific configuration of the invention is described in claims.

According to the invention, it is possible to provide a photocatalyst decomposition system that can supply a gas phase containing a substance to be decomposed by a photocatalyst and that can perform decomposition of the substance more efficiently than in the related art.

Objects, configurations, and effects other than those described above will be clarified by the following description of embodiments.

DESCRIPTION OF EMBODIMENTS

Hereinafter, a configuration of the invention will be described in detail with reference to the drawings.

Figure 1:
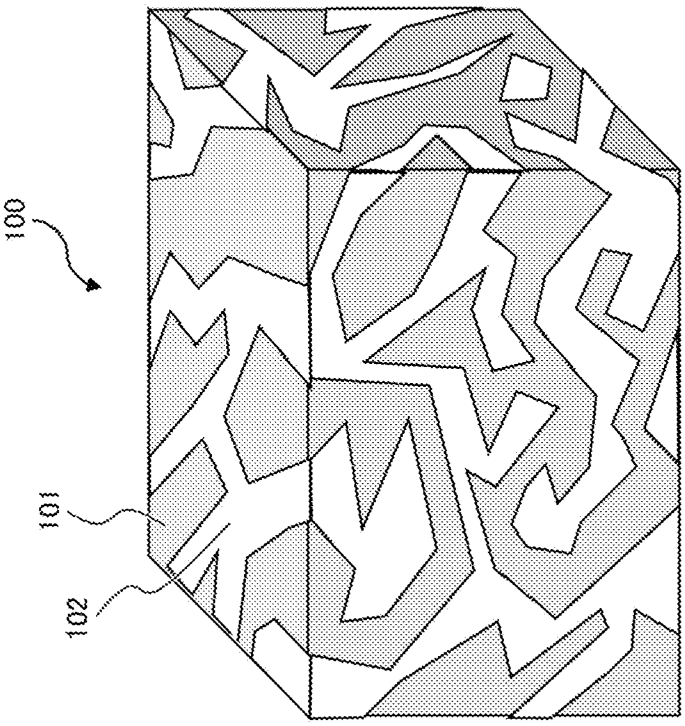
FIG. 1 is a schematic view of a porous material.
Figure 2:
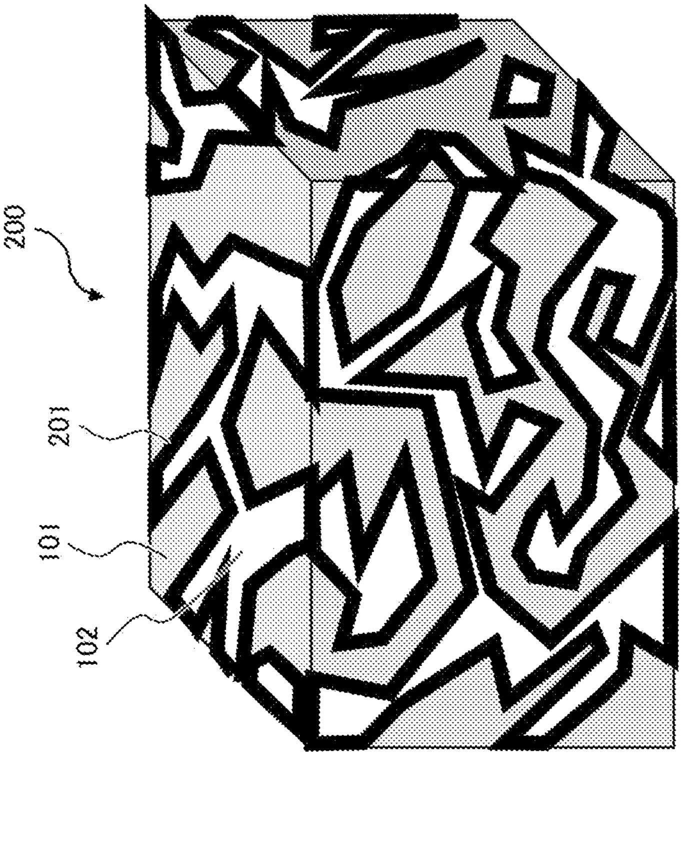
FIG. 2 is a schematic view of a photocatalyst member provided in a photocatalyst decomposition apparatus according to the invention.

As described above, a photocatalyst decomposition system according to the invention includes: a gas phase generation apparatus configured to convert a liquid phase containing a decomposition object into a gas phase; and a photocatalyst member configured to come into contact with the gas phase to decompose the decomposition object by light from a light source and generate a gas phase. The photocatalyst member includes a base material formed of a porous material and a photocatalyst layer provided on a surface of the base material. First, the photocatalyst member will be described. FIG. 1 is a schematic view of a porous material. FIG. 2 is a schematic view of a photocatalyst member provided in the photocatalyst decomposition system according to the invention. A porous material 100 shown in FIG. 1 is a nanoporous material having a pore 102 of several μm to several tens of μm in a base material 101. A photocatalyst member 200 in the invention, as shown in FIG. 2, is provided with a photocatalyst layer 201 on a surface of the nanoporous material shown in FIG. 1. In the invention, by using such a photocatalyst member 200, a gas-like or gaseous substance is converted into another gas or substance by a photocatalytic reaction with light from a light source.

The photocatalyst decomposition system according to the invention converts a liquid phase containing a decomposition object into a gas phase (vapor) and brings the gas phase into contact with the photocatalyst member to decompose the decomposition object. By providing the photocatalyst layer 201 on the base material 101 formed of the porous material as described above, a surface area of a photocatalytic reaction portion is increased, and further, a generated gas phase is released without remaining in the photocatalytic reaction portion. Accordingly, it is possible to prevent a phenomenon in which a surface of the photocatalyst layer 201 is covered with air bubbles generated when the liquid phase is brought into contact with the photocatalyst member, and to prevent a decrease in a contact area between the gas phase and the photocatalyst layer 201.

The photocatalyst member provided in the photocatalyst decomposition system according to the invention can decompose not only a gas phase but also a liquid phase.

The base material 101 is a material that transmits light having a wavelength of at least visible light or ultraviolet light, and is preferably a material having a three-dimensional block structure having a porous or reticular fiber material as a skeleton. The material of the base material 101 preferably contains $SiO_2$, $Al_2O_3$, $TiO_2$, MgO, ZnO, $CaCO_3$, CaO, a transparent carbon nanotube (CNT), or SnO.

The photocatalyst layer 201 is not particularly limited, and for example, at least one of substances listed in the following (1) to (4) can be preferably used, or a combination of these substances may be used.

(1) $BiVO_4$ doped with Rh or black phosphorus, or $BiVO_4$,
(2) $SrTiO_3$ doped with Rh, Ir, La, or Al, or $SrTiO_3$,
(3) LaON, $TiO_2$, GaP, $SnNb_2O_6$, or $NaTaO_3$ doped with La, or $NaTaO_3$, and
(4) TaON, $LaTiO_2N$, TaON, $Ta_3N_5$, $SrTa_2ON$, $LaTa_2ON$, $ZnRh_2O_4$, $Sm_2Ti_2O_5S_2$, $Y_2Ti_2O_2S_5$, g-$C_3N_4$, $Ga_3N_4$, $Cu_{0.25}Ag_{0.25}In_{0.25}ZnS_2$, or $CuAgZnSnS_4$ Particles of a co-catalyst material that promotes the photocatalytic reaction may be supported on, or a thin film of the co-catalyst material may be provided on at least a part of the photocatalyst layer 201. The co-catalyst material is not particularly limited, and $WO_3$, $Rh/Cr_2O_3$, Ag, $Rh/SrTiO_3$, Pt, CoO, $Co_3O_4$, $IrO_2$, $PtO_2$, phosphorus, NiO, $RuO_2$, $AgSbO_3$, or $ZnRhO_x$ can be preferably used.

A porosity (a volume ratio of the pore 102) of the photocatalyst member 200 is preferably 40% to 95% (40% or more and 95% or less). When the porosity is less than 40%, it is difficult to provide a sufficient surface area for the reaction of the photocatalyst layer 201. When the porosity exceeds 95%, it is difficult to secure strength of the photocatalyst member 200. The base material 101 preferably has a pore width of 10 μm to 500 μm.

A surface area in the pore of the nanoporous material is 10 $m^2/g$ to 1000 $m^2/g$ (general value). A pore size and material can have various variations (porous glass specific gravity: 1 $g/cm^2$ to 2 $g/cm^2$).

As a method for producing the photocatalyst member 200, the pore 102 in the porous material as the base material 101 can be subjected to immersion, vacuum impregnation, vacuum aeration, or spin coating with respect to a liquid obtained by mixing a liquid (MOD material) containing a metal organic compound that contains the material of the photocatalyst layer 201 and a metal complex solution or a metal-oxide colloid solution produced by a sol-gel method, followed by sintering to produce an object with photocatalyst coating and modification on an inner surface of the pore. Various photocatalyst materials can be synthesized by selectively using the above method. A coating film is continuous up to an internal structure, thereby enabling electrical conduction from the surface. In other words, an outer surface of the photocatalyst member 200 and a surface of the pore 102 in the photocatalyst member 200 have electrical continuity. A transparent conductive thin film layer may be provided on a surface of the photocatalyst layer 201 or between the base material 101 and the photocatalyst layer 201, and the photocatalyst layer 201 and the transparent conductive thin film layer may be electrically connected to each other.

EMBODIMENTS

Hereinafter, the photocatalyst decomposition system according to the invention including the above-described photocatalyst member will be described in detail.

Embodiment 1

Figure 3:
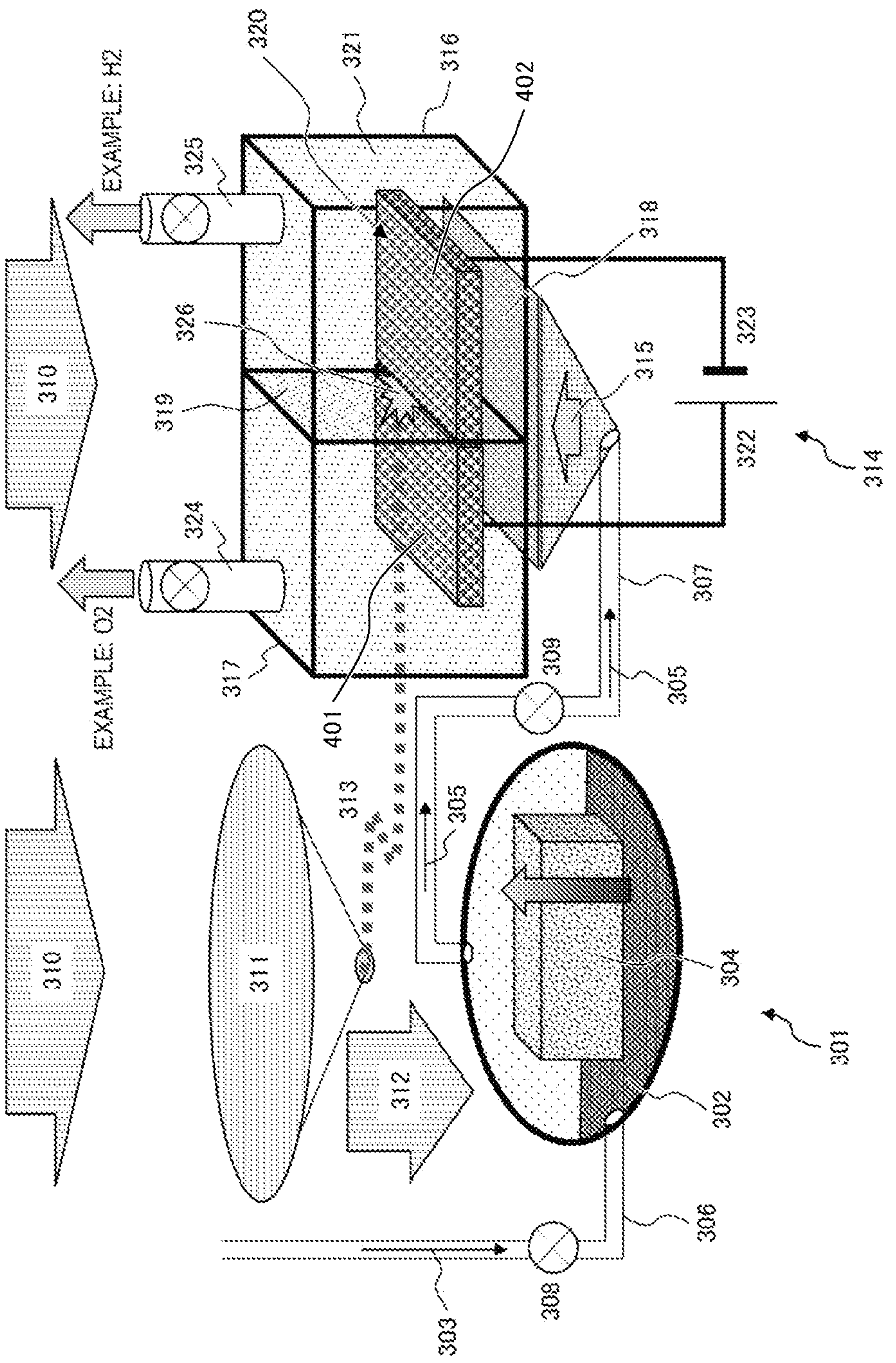
FIG. 3 schematically shows a photocatalyst decomposition system according to Embodiment 1.

FIG. 3 schematically shows a photocatalyst decomposition system according to Embodiment 1. As shown in FIG. 3, a photocatalyst decomposition system 300*a* according to the present embodiment includes a photocatalyst member 320 using the above-described photocatalyst member 200 and a vapor supply apparatus 301 configured to supply vapor to the photocatalyst member 320. The photocatalyst decomposition system supplies a light source (for example, sunlight 310) to the vapor supply apparatus 301 and the photocatalyst member 320 by light supply apparatuses. The photocatalyst decomposition system 300*a* comprises a housing configured to accommodate the photocatalyst member 320. A transparent window, a lens, or an optical path is provided in the housing, and the sunlight 310 is emitted to the photocatalyst member 320 via the transparent window, the lens, or the optical path. It is preferable that ultraviolet to visible light 311 obtained by spectroscopy and collection of the sunlight 310 outside the housing is introduced into the housing, supplied and emitted to the photocatalyst member 320 through an optical fiber 313, and infrared light 312 obtained by spectroscopy and collection of the sunlight 310 is supplied to the vapor supply apparatus 301, whereby each apparatus can function efficiently.

In the vapor supply apparatus 301, a liquid phase (for example, water) 303 containing a decomposition object, which is supplied through a liquid phase (water) supply pipe 306, is heated using the sunlight 310 by a vapor generation member 304 provided in a vapor generation container 302 to generate vapor 305. The generated vapor is supplied to a photocatalyst decomposition apparatus 314 via a vapor transfer pipe 307.

In the photocatalyst decomposition apparatus 314, the supplied vapor 305 is supplied to the photocatalyst member 320 via a vapor introduction portion 315 and a vapor discharge portion 318.

The photocatalyst member 320 is divided into at least two photocatalyst members 401 and 402 by a separation film 319 formed by a proton conductive film, and electrodes 322 and 323 as voltage application apparatuses are connected to the at least two photocatalyst members 401 and 402, respectively, so that a potential can be adjusted. Furthermore, a gas or water vapor is supplied to the at least two photocatalyst members 401 and 402, respectively. A generated substance can be separated by adjusting the potential by the electrodes 322 and 323.

Generated gases 324 and 325 generated by decomposing the vapor 305 by the photocatalyst member 320 are discharged to the outside. For example, when the vapor 305 is water, oxygen ($O_2$), hydrogen ($H_2$), and water vapor ($H_2O$) are discharged as the generated gas. The decomposition object is not limited to water and can also be carbon dioxide ($CO_2$), nitrogen oxide ($NO_x$), or methane ($CH_3$). A gas phase generated by decomposition by the photocatalyst member 320 is collected by a collection apparatus.

According to the above-described photocatalyst decomposition system 300*a* in the invention, the decomposition object contained in the liquid phase can be decomposed efficiently by the photocatalyst after being converted into the gas phase by using natural energy such as sunlight. Since the photocatalyst member 320 used for decomposition by the photocatalyst has a reaction structure (which is porous) through which vapor can pass, a larger surface area can be used in a three-dimensional space.

Further, by providing the electrodes 322 and 323, the decomposition reaction by the photocatalyst can be controlled.

Embodiment 2

Figure 4:
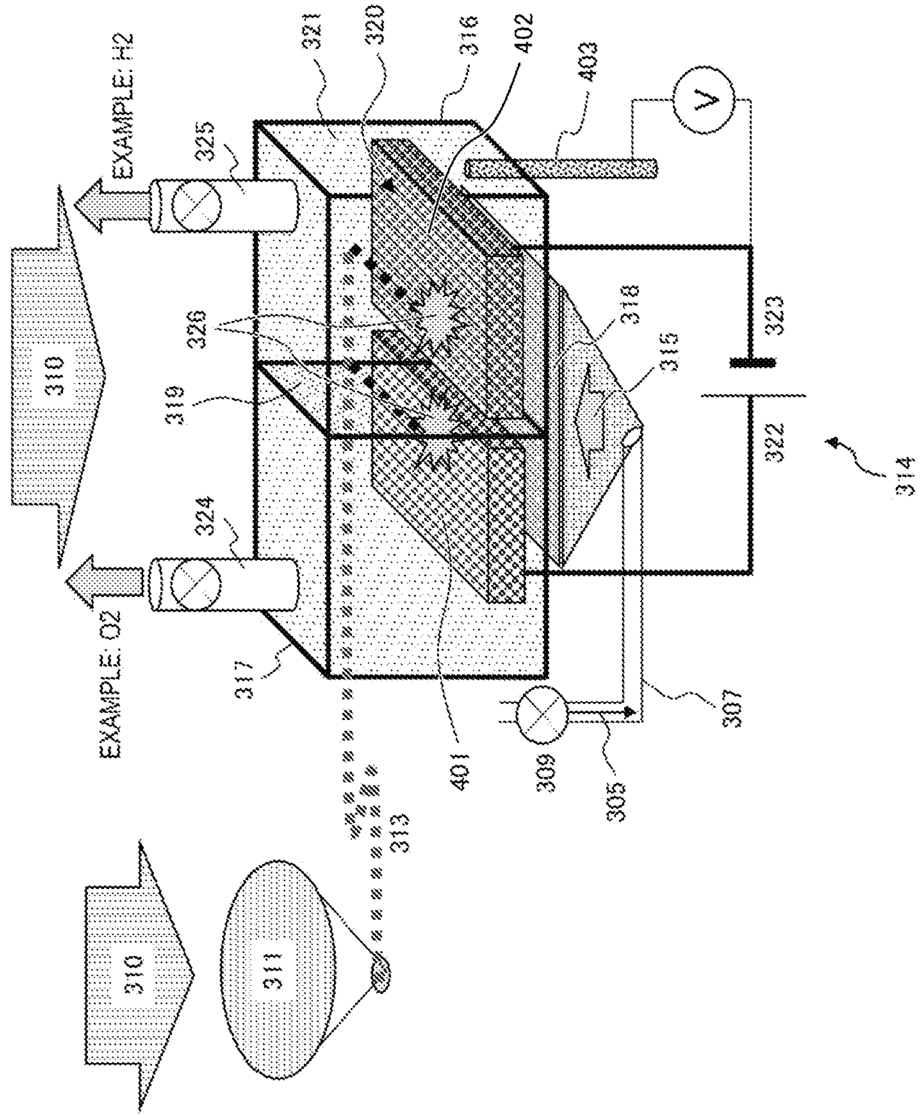
FIG. 4 schematically shows a photocatalyst decomposition system according to Embodiment 2.

FIG. 4 schematically shows a photocatalyst decomposition system 300*b* according to Embodiment 2. FIG. 4 mainly shows a configuration of the photocatalyst decomposition apparatus 314 constituting the photocatalyst decomposition system 300*b*. The photocatalyst decomposition system 300*b* according to the present embodiment is different from the photocatalyst decomposition system 300*a* according to Embodiment 1 in that a reference electrode 403 is provided. Accordingly, a potential of the electrodes 322 and 323 can be controlled. As the reference electrode 403, Ag/AgCl can be used.

Embodiment 3

Figure 5:
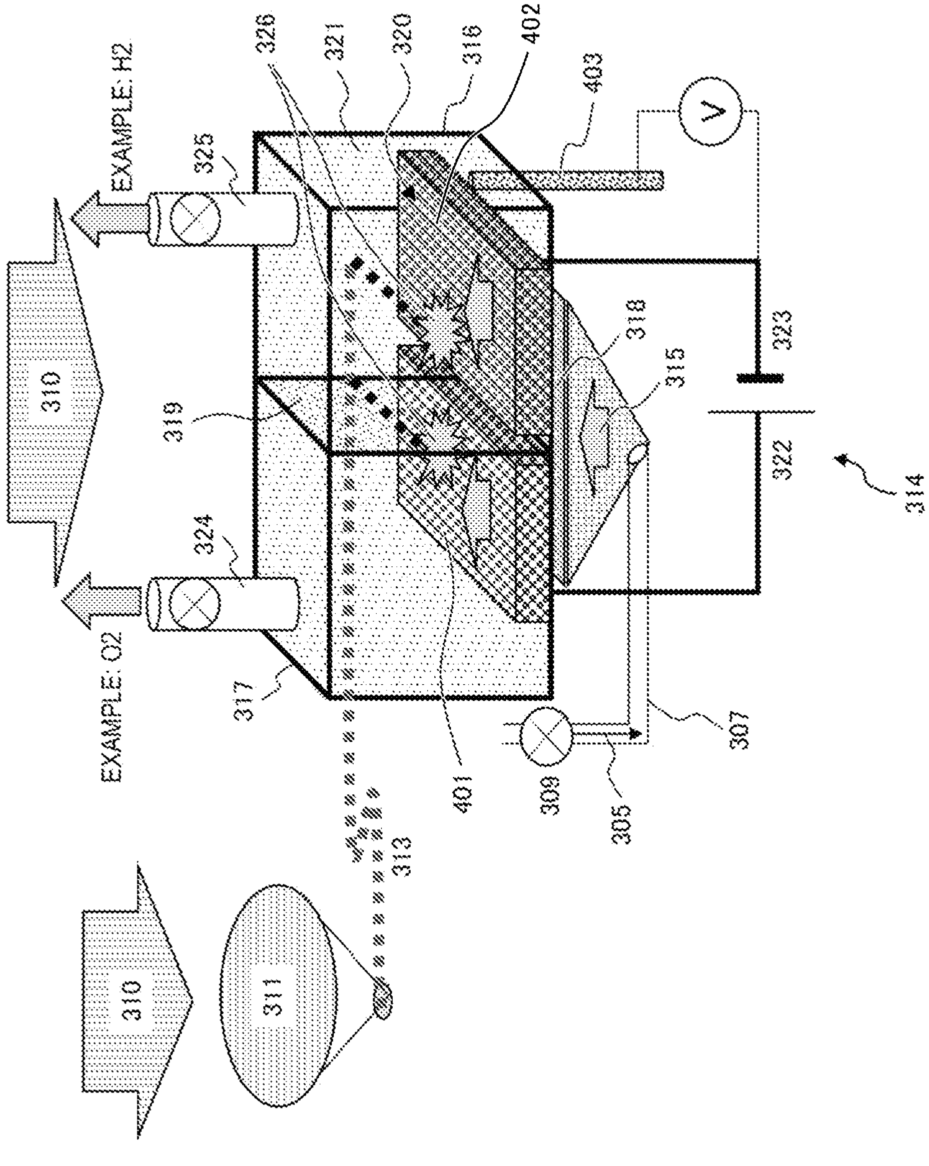
FIG. 5 schematically shows a photocatalyst decomposition system according to Embodiment 3.

FIG. 5 schematically shows a photocatalyst decomposition system 300*c* according to Embodiment 3. FIG. mainly shows a configuration of the photocatalyst decomposition apparatus 314 constituting the photocatalyst decomposition system 300*c*. The photocatalyst decomposition system 300*c* according to the present embodiment is different from the photocatalyst decomposition system 300*b* according to Embodiment 2 in that the photocatalyst member 320 is in direct contact with the vapor discharge portion 318. With such a configuration, the vapor 305 can be more efficiently supplied to the photocatalyst member 320.

Embodiment 4

Figure 6:
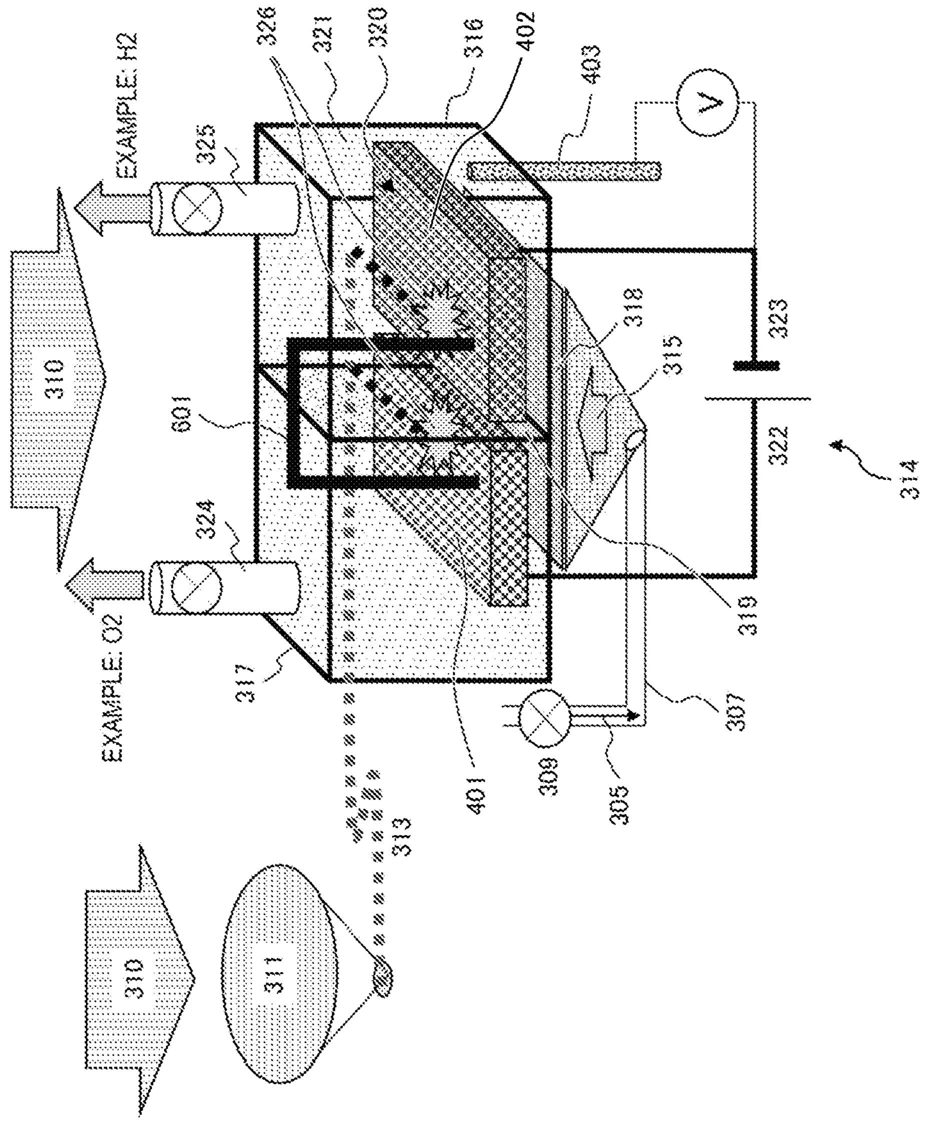
FIG. 6 schematically shows a photocatalyst decomposition system according to Embodiment 4.

FIG. 6 schematically shows a photocatalyst decomposition system 300*d* according to Embodiment 4. FIG. 6 mainly shows a configuration of the photocatalyst decomposition apparatus 314 constituting the photocatalyst decomposition system 300*d*. The photocatalyst decomposition system 300*d* according to the present embodiment is different from the photocatalyst decomposition system 300*b* according to Embodiment 2 in that a conduction terminal 601 is provided. With such a configuration, a carrier can be exchanged between the electrodes 322 and 323, and the photocatalytic decomposition reaction can be controlled more precisely to perform reaction efficiently.

Embodiment 5

Figure 7:
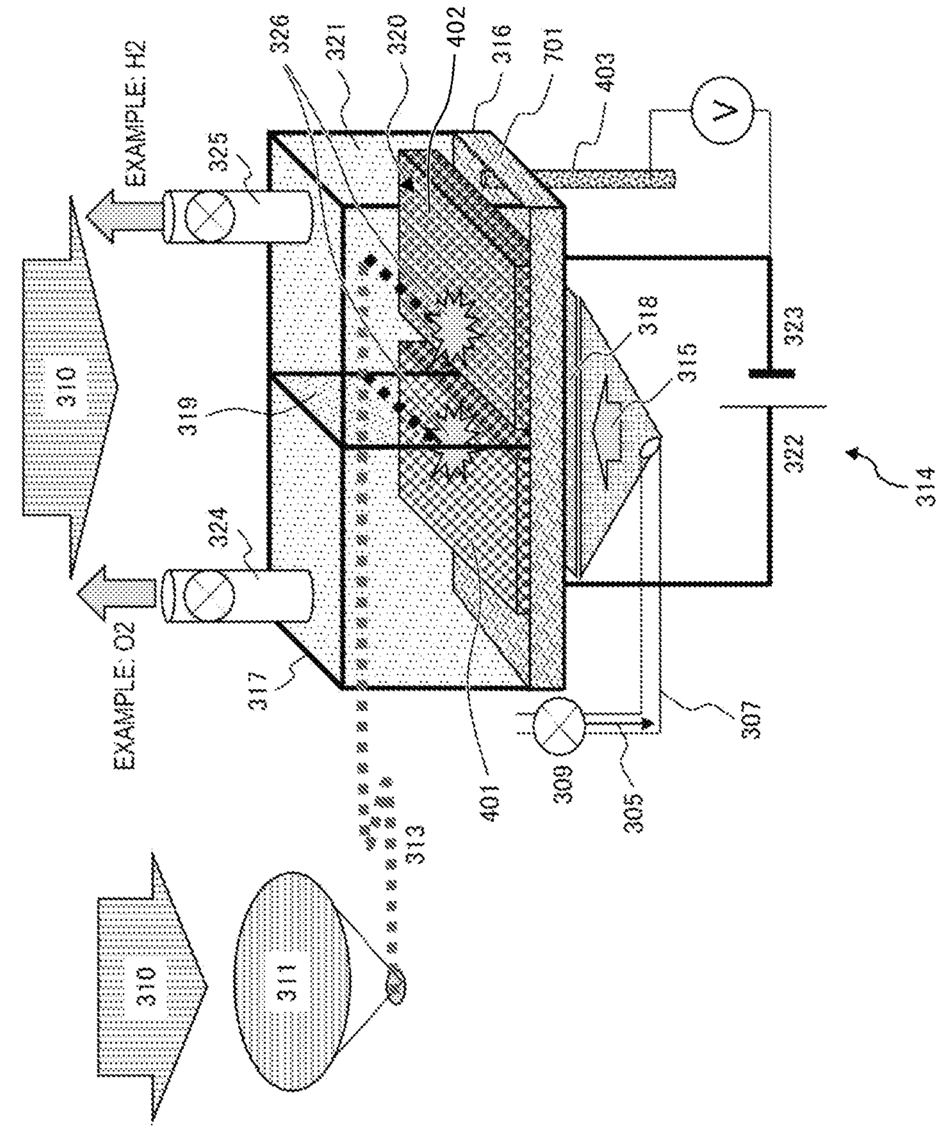
FIG. 7 schematically shows a photocatalyst decomposition system according to Embodiment 5.

FIG. 7 schematically shows a photocatalyst decomposition system 300*e* according to Embodiment 5. FIG. 7 mainly shows the photocatalyst decomposition apparatus 314 of the photocatalyst decomposition system 300*e*. The photocatalyst decomposition system 300*e* according to the present embodiment is different from the photocatalyst decomposition system 300*b* according to Embodiment 2 in that the photocatalyst member 320 is in contact with a liquid phase 701. With such a configuration, the liquid phase can be directly supplied to the photocatalyst member 320, and the liquid phase 701 can be efficiently subjected to a reaction simultaneously with decomposition of the gas phase 305.

Embodiment 6

Figure 8:
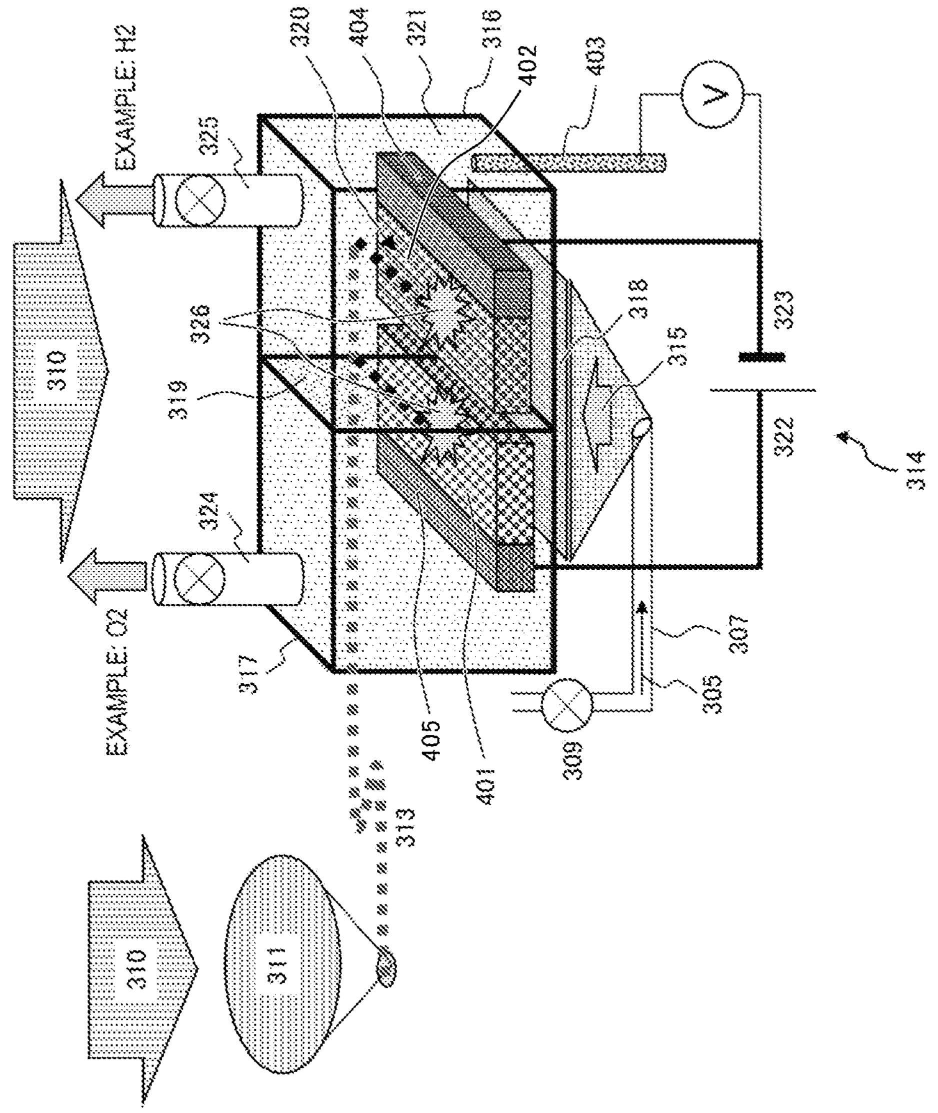
FIG. 8 schematically shows a photocatalyst decomposition system according to Embodiment 6.

FIG. 8 schematically shows a photocatalyst decomposition system 300*f* according to Embodiment 6. FIG. 8 mainly shows the photocatalyst decomposition apparatus 314 constituting the photocatalyst decomposition system 300*f*. The photocatalyst decomposition system 300*f* according to the present embodiment is different from the photocatalyst decomposition system 300*b* according to Embodiment 2 in that the photocatalyst member 320 is provided with co-catalyst-attached electrodes 404 and 405. With such a configuration, the photocatalyst member 320 can be efficiently subjected to a reaction.

As described above, according to the invention, it is possible to provide a photocatalyst decomposition apparatus that can supply a gas phase containing a substance to be decomposed by a photocatalyst and that can perform decomposition of the substance more efficiently than in the related art.

The invention is not limited to the above-described embodiments, and includes various modifications. For example, the embodiments described above have been described in detail to facilitate understanding of the invention, and the invention is not necessarily limited to those including all the configurations described above. In addition, a part of the configuration of one embodiment can be replaced with the configuration of another embodiment, and the configuration of another embodiment can be added to the configuration of one embodiment. In addition, a part of the configuration of each embodiment may be added to, deleted from, or replaced with another configuration.

What is claimed is:

1. A photocatalyst decomposition system comprising:

a gas phase generation apparatus configured to convert a liquid phase containing a decomposition object into a gas phase; and a photocatalyst member configured to come into contact with the gas phase to decompose the decomposition object by light from a light source, wherein the photocatalyst member includes a base material formed of a porous material and a photocatalyst layer provided on a surface of the base material, the gas phase generation apparatus is separate from the photocatalyst member and includes a vapor generation container and a vapor generation member configured to heat the liquid phase supplied to the vapor generation container to generate the gas phase, and the gas phase generated by the gas phase generation apparatus is supplied to the photocatalyst member through a vapor transfer pipe.

2. The photocatalyst decomposition system according to claim 1, wherein the photocatalyst member is also configured to come into contact with the liquid phase to decompose the decomposition object.

3. The photocatalyst decomposition system according to claim 1, wherein an outer surface of the photocatalyst member and a surface of a pore in the photocatalyst member have electrical continuity.

4. The photocatalyst decomposition system according to claim 1, wherein a transparent conductive thin film layer is provided on a surface of the photocatalyst layer or between the base material and the photocatalyst layer, and the photocatalyst layer and the transparent conductive thin film layer are electrically connected to each other.

5. The photocatalyst decomposition system according to claim 1, further comprising:

a configuration configured to adjust a potential by at least one pair of electrodes in contact with the photocatalyst member.

6. The photocatalyst decomposition system according to claim 5, wherein a generated substance is separated by adjusting the potential by the electrode.

7. The photocatalyst decomposition system according to claim 1, further comprising:

at least two of the photocatalyst members;

a proton conductive film provided between the at least two of the photocatalyst members; and a pair of electrodes connected to the at least two of the photocatalyst members, respectively, wherein a potential is adjustable by the electrodes, and a gas or water vapor is supplied to the at least two of the photocatalyst members, respectively.

8. The photocatalyst decomposition system according to claim 1, further comprising:

a housing configured to accommodate the photocatalyst member, wherein the light source is sunlight, and a transparent window, a lens, or an optical path is provided in the housing, and the sunlight is emitted to the photocatalyst member via the transparent window, the lens, or the optical path.

9. The photocatalyst decomposition system according to claim 8, wherein the sunlight is separated outside the housing into ultraviolet to visible light and infrared light, light condensed outside the housing is introduced into the housing through an optical fiber and emitted to the photocatalyst member, the light condensed outside the housing and introduced through the optical fiber being the ultraviolet to visible light, and the infrared light is supplied to the gas phase generation apparatus to heat the liquid phase.

10. The photocatalyst decomposition system according to claim 1, wherein the base material transmits light having a wavelength of at least visible light or ultraviolet light.

11. The photocatalyst decomposition system according to claim 1, wherein the base material has a pore width of 10 μm to 500 μm and a porosity of 40% to 95%.

12. The photocatalyst decomposition system according to claim 1, wherein the porous material forming the base material contains $SiO_2$, $Al_2O_3$, $TiO_2$, MgO, ZnO, $CaCO_3$, CaO, SnO, or a transparent carbon nanotube.

13. The photocatalyst decomposition system according to claim 1, wherein the photocatalyst layer is at least one of substances listed in the following (1) to (4):

(1) $BiVO_4$ doped with Rh or black phosphorus, or $BiVO_4$, (2) $SrTiO_3$ doped with Rh, Ir, La, or Al, or $SrTiO_3$, (3) LaON, $TiO_2$, GaP, $SnNb_2O_6$, or $NaTaO_3$ doped with La, or $NaTaO_3$, and (4) TaON, $LaTiO_2N$, TaON, $Ta_3N_5$, $SrTa_2ON$, $LaTa_2ON$, $ZnRh_2O_4$, $Sm_2Ti_2O_5S_2$, $Y_2Ti_2O_2S_5$, g-$C_3N_4$, $Ga_3N_4$, $Cu_{0.25}Ag_{0.25}In_{0.25}ZnS_2$, or $CuAgZnSnS_4$.

14. The photocatalyst decomposition system according to claim 1, wherein particles of a co-catalyst material are supported on, or a thin film of the co-catalyst material is provided on at least a part of the photocatalyst layer.

15. The photocatalyst decomposition system according to claim 14, wherein the co-catalyst material is $WO_3$, Rh/$Cr_2O_3$, Ag, Rh/$SrTiO_3$, Pt, CoO, $Co_3O_4$, $IrO_2$, $PtO_2$, phosphorus, NiO, $RuO_2$, $AgSbO_3$, or $ZnRhO_x$.

16. The photocatalyst decomposition system according to claim 1, further comprising:

a light supply apparatus configured to supply light to the photocatalyst member and the gas phase generation apparatus; and a collection apparatus configured to collect a gas phase generated by decomposition by the photocatalyst member.

17. The photocatalyst decomposition system according to claim 1, wherein the base material has a three-dimensional block structure having a porous or reticular fiber material as a skeleton.

18. The photocatalyst decomposition system according to claim 1, wherein the decomposition object contained in the liquid phase is carbon dioxide, nitrogen oxide, or methane.

19. The photocatalyst decomposition system according to claim 1, wherein the gas phase generation apparatus further includes a liquid phase supply pipe configured to supply the liquid phase to the vapor generation container, and the vapor generation member is configured to heat the liquid phase using sunlight.

20. The photocatalyst decomposition system according to claim 1, further comprising:

a photocatalyst decomposition apparatus configured to accommodate the photocatalyst member, wherein the photocatalyst decomposition apparatus includes a vapor introduction portion and a vapor discharge portion, the gas phase supplied through the vapor transfer pipe is supplied to the photocatalyst member via the vapor introduction portion and the vapor discharge portion, and the photocatalyst member is in direct contact with the vapor discharge portion.

* * * * *